US008843425B2

(12) United States Patent
Modha

(10) Patent No.: US 8,843,425 B2
(45) Date of Patent: Sep. 23, 2014

(54) HIERARCHICAL ROUTING FOR TWO-WAY INFORMATION FLOW AND STRUCTURAL PLASTICITY IN NEURAL NETWORKS

(75) Inventor: Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 13/194,596

(22) Filed: Jul. 29, 2011

(65) Prior Publication Data

US 2013/0031040 A1    Jan. 31, 2013

(51) Int. Cl.
*G06N 3/08* (2006.01)
*G06N 3/04* (2006.01)

(52) U.S. Cl.
CPC ................................. *G06N 3/049* (2013.01)
USPC .................................................... 706/25

(58) Field of Classification Search
CPC .................................................. G06N 3/0489
See application file for complete search history.

(56) References Cited

U.S. PATENT DOCUMENTS

| | | | | |
|---|---|---|---|---|
| 5,150,450 | A * | 9/1992 | Swenson et al. ............... | 706/25 |
| 6,242,988 | B1 | 6/2001 | Sarpeshkar | |
| 7,174,325 | B1 | 2/2007 | Ascoli | |
| 7,398,259 | B2 | 7/2008 | Nugent | |
| 7,457,787 | B1 * | 11/2008 | Furber ........................... | 706/15 |
| 7,502,769 | B2 * | 3/2009 | Nugent ........................... | 706/26 |
| 7,672,918 | B2 | 3/2010 | Adkins | |
| 8,463,723 | B2 * | 6/2013 | Modha et al. ................... | 706/33 |
| 8,510,239 | B2 * | 8/2013 | Modha ........................... | 706/14 |
| 2003/0208451 | A1 | 11/2003 | Liaw | |
| 2005/0086436 | A1 * | 4/2005 | Modha .......................... | 711/133 |
| 2009/0132451 | A1 | 5/2009 | Fiorillo | |
| 2009/0287624 | A1 | 11/2009 | Rouat | |
| 2009/0292661 | A1 * | 11/2009 | Haas ............................... | 706/33 |
| 2010/0076916 | A1 | 3/2010 | van der Made | |
| 2010/0220523 | A1 * | 9/2010 | Modha et al. ................... | 365/167 |
| 2010/0223220 | A1 * | 9/2010 | Modha et al. ................... | 706/33 |
| 2010/0299297 | A1 * | 11/2010 | Breitwisch et al. .............. | 706/33 |
| 2011/0004579 | A1 * | 1/2011 | Snider ............................. | 706/25 |
| 2011/0119214 | A1 * | 5/2011 | Breitwisch et al. .............. | 706/33 |

(Continued)

OTHER PUBLICATIONS

Garis et al., "A World Survey of Artificial Brain Projects, Part 1: Large-Scale Brain Simulations", 2010, Elsevier, Neurocomputing 74, pp. 3-29.*

(Continued)

*Primary Examiner* — Jeffrey A Gaffin
*Assistant Examiner* — Paulinho E Smith
(74) *Attorney, Agent, or Firm* — Kenneth L. Sherman, Esq.; Michael Zarrabian, Esq.; Sherman & Zarrabian LLP

(57) ABSTRACT

Hierarchical routing for two-way information flow and structural plasticity in a neural network is provided. In one embodiment the network includes multiple core modules, wherein each core module has a plurality of incoming connections with predetermined addresses. Each core module also has a plurality of outgoing connections such that each outgoing connection targets an incoming connection in a core module among the multiple core modules. The network also has a routing system that selectively routes signals among the core modules based on a reconfigurable hierarchical organization of the core modules. The network approximates a fully connected network such that each outgoing connection on any core module can target and reach any incoming connection on any core module without requiring a fully connected network. The routing system provides two-way information flow between neurons utilizing hierarchical routing.

20 Claims, 13 Drawing Sheets

(56) References Cited

U.S. PATENT DOCUMENTS

| | | | |
|---|---|---|---|
| 2011/0153533 A1* | 6/2011 | Jackson et al. | 706/17 |
| 2012/0084240 A1* | 4/2012 | Esser et al. | 706/27 |
| 2012/0084241 A1* | 4/2012 | Friedman et al. | 706/27 |
| 2012/0109863 A1* | 5/2012 | Esser et al. | 706/25 |
| 2012/0109864 A1* | 5/2012 | Modha | 706/25 |
| 2012/0109866 A1* | 5/2012 | Modha | 706/28 |
| 2012/0150781 A1* | 6/2012 | Arthur et al. | 706/35 |
| 2012/0173471 A1* | 7/2012 | Ananthanarayanan et al. | 706/25 |
| 2012/0259804 A1* | 10/2012 | Brezzo et al. | 706/25 |
| 2012/0265719 A1* | 10/2012 | Modha et al. | 706/15 |
| 2013/0031040 A1* | 1/2013 | Modha | 706/27 |
| 2013/0073493 A1* | 3/2013 | Modha | 706/25 |
| 2013/0073494 A1* | 3/2013 | Modha | 706/25 |
| 2013/0198121 A1* | 8/2013 | Modha et al. | 706/26 |

OTHER PUBLICATIONS

Kwabena Boahen, "Point-to-Point Connectivity Between Neuromorphic Chips Using Address Events", May 2000, IEEE Transactions on Circuits and Systems—II: Analogy and Digital Signal Processing, vol. 47 No. 5, pp. 416-434.*

Modha, D., U.S. Appl. No. 13/149,754, filed May 31, 2011 entitled "Low-Power Event-Driven Neural Computing Architecture in Neural Networks", 49 pp., United States.

Paugam-Moisy, H. et al., "A supervised learning approach based on STDP and polychronization in spiking neuron networks," Proceedings of the 2007 European Symposium on Artificial Neural Networks (ESANN'207), Apr. 25-27, 2007, pp. 427-432, Bruges, Belgium.

Mattia, M. et al., "Efficient Event-Driven Simulation of Large Networks of Spiking Neurons and Dynamical Synapses," Massachusetts Institute of Technology, Neural Computation 12, Oct. 2000, pp. 2305-2329, Vo. 12, No. 10, MIT Press, United States.

Paugam-Moisy, H. et al., "Computing with Spiking Neuron Networks," Handbook of Natural Computing, 2012, pp. 1-49, Springer Berlin Heidelberg, United States.

* cited by examiner

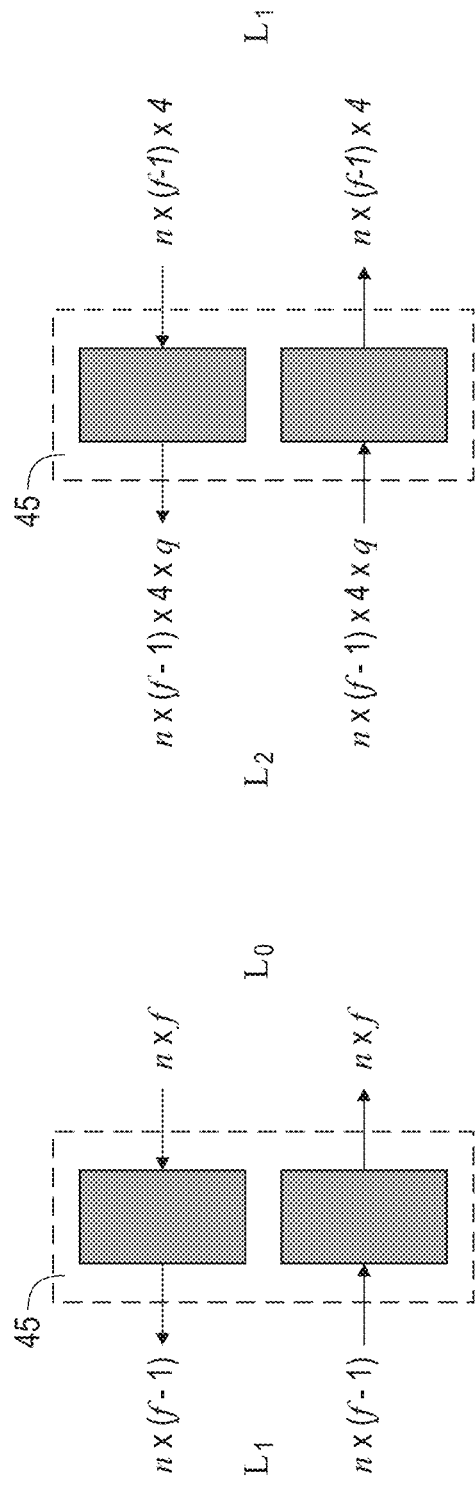

US 8,843,425 B2

HIERARCHICAL ROUTING FOR TWO-WAY INFORMATION FLOW AND STRUCTURAL PLASTICITY IN NEURAL NETWORKS

This invention was made with Government support under HR0011-09-C-0002 awarded by Defense Advanced Research Projects Agency (DARPA). The Government has certain rights in this invention.

BACKGROUND

The present invention relates to neuromorphic and synaptronic systems, and in particular neuromorphic and synaptronic event driven circuits for neural networks.

Neuromorphic and synaptronic systems, also referred to as artificial neural networks, are computational systems that permit electronic systems to essentially function in a manner analogous to that of biological brains. Neuromorphic and synaptronic systems do not generally utilize the traditional digital model of manipulating 0s and 1s. Instead, neuromorphic and synaptronic systems create connections between processing elements that are roughly functionally equivalent to neurons of a biological brain. Neuromorphic and synaptronic systems may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention provide hierarchical routing for two-way information flow and structural plasticity in neural networks. One embodiment of a network comprises multiple core modules, wherein each core module includes a plurality of incoming connections such that each incoming connection has a predetermined address. Each core module further includes a plurality of outgoing connections such that each outgoing connection targets an incoming connection in a core module among the multiple core modules. The network further comprises a routing system that selectively routes signals among the core modules based on a reconfigurable hierarchical organization of the core modules. The routing system provides two-way information flow between neurons utilizing hierarchical routing.

These and other features, aspects and advantages of the present invention will become understood with reference to the following description, appended claims and accompanying figures.

BRIEF DESCRIPTION OF THE SEVERAL VIEWS OF THE DRAWINGS

FIG. 4A shows a block diagram of a routing module and routing process based on a hierarchical structure in a neural network, in accordance with an embodiment of the invention;

FIG. 4B shows a block diagram of another routing module and routing process based on a hierarchical structure in a neural network, in accordance with an embodiment of the invention;

DETAILED DESCRIPTION

Figure 1A:
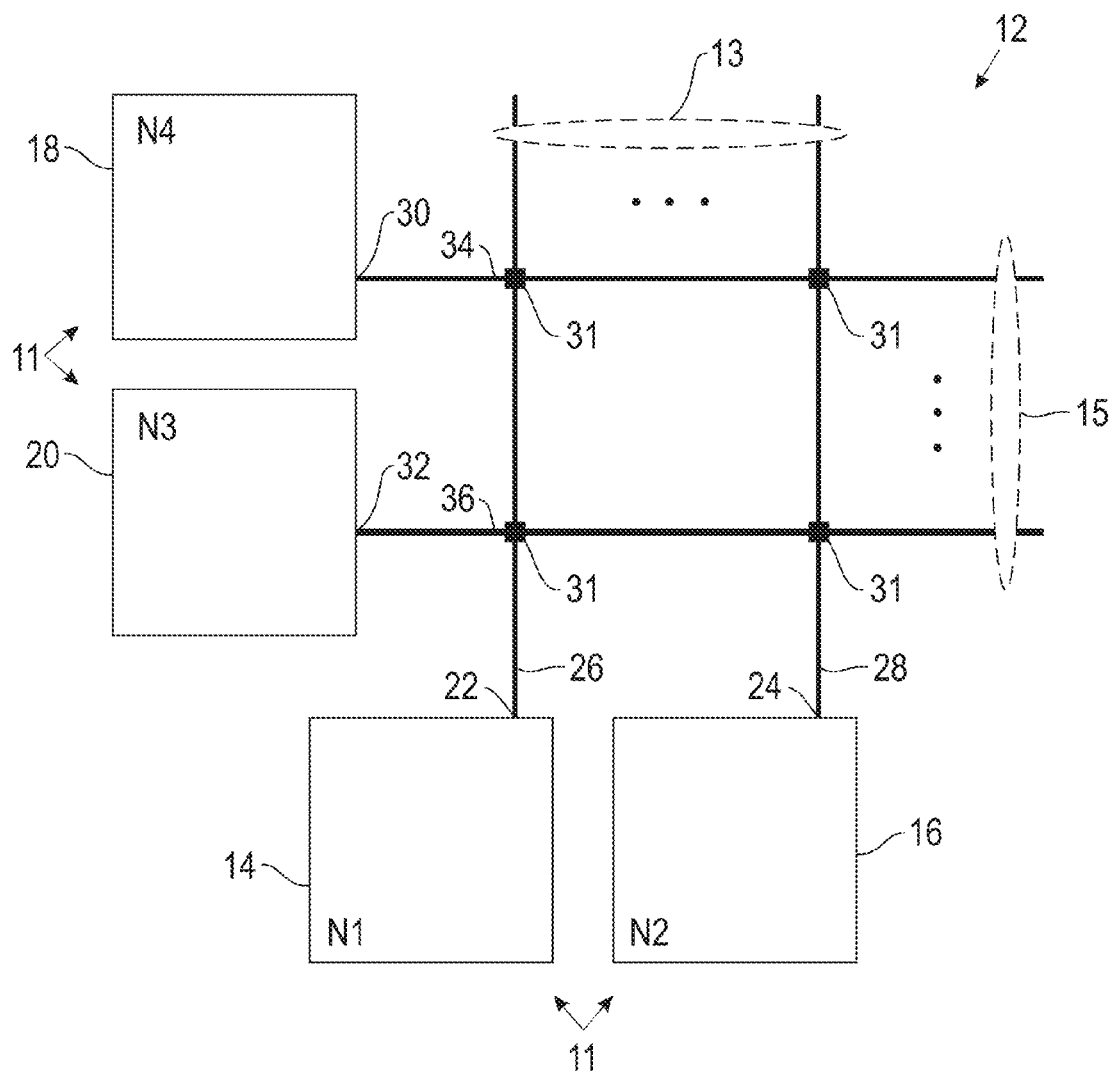
FIG. 1A shows a block diagram of a neural core module implemented as a neural core circuit, in accordance with an embodiment of the invention.

Embodiments of the invention provide hierarchical routing for two-way information flow and structural plasticity in neural networks. In one embodiment, the present invention provides a neural network comprising a hierarchical routing fabric for neural modules, wherein the routing fabric provides two-way information flow and structural plasticity. Routing of information between the neural modules is adaptive.

In one embodiment a neural module comprises a core module. In one implementation a core module comprises a core circuit including a plurality of electronic neurons interconnected via an interconnect network. The interconnect network includes a plurality of synapse devices, wherein each neuron integrates input signals arriving on its dendrite via the interconnect network, generates a spike signal in response to the integrated input signals exceeding a threshold, and sends the spike signal to the interconnect network via its axon.

The term electronic neuron as used herein represents an architecture configured to simulate a biological neuron. An electronic neuron creates connections between processing elements that are roughly functionally equivalent to neurons of a biological brain. As such, a neuromorphic and synaptronic system comprising electronic neurons according to embodiments of the invention may include various electronic circuits that are modeled on biological neurons. Further, a neuromorphic and synaptronic system comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic system according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

In each core, each synapse interconnects an axon of a pre-synaptic neuron with a dendrite of a post-synaptic neuron. Each neuron integrates input spikes and generates a spike in response to the integrated input spikes exceeding a threshold. A neuron communicates with an axon in another (or the same) core by sending a spike message.

In one embodiment of the invention, a network comprises multiple core modules, each core module including a plurality of incoming connections such that each incoming connection has a predetermined address, and each core module including a plurality of outgoing connections such that each outgoing connection targets an incoming connection in a core module among the multiple core modules. The network further includes a routing system that selectively routes signals among the core modules based on a reconfigurable hierarchical organization.

In one embodiment, each core module further comprises a plurality of axons including the incoming connections and a plurality of dendrites, and a plurality of neurons. The core module further includes an electronic synapse array comprising multiple digital synapses interconnecting said axons with the said dendrites, wherein a synapse interconnects an axon of a pre-synaptic neuron with a dendrite of a post-synaptic neuron. In one embodiment, each incoming connection comprises an axon and each outgoing connection comprises a post-synaptic neuron connected with a dendrite in the synapse array. A dendrite of each post-synaptic neuron connects to an outgoing connection. Each neuron integrates input spikes and generates a spike event in response to the integrated input spikes exceeding a firing threshold.

In one embodiment of the hierarchical organization, a core module is a root node, one or more core modules are intermediate nodes, and one or more core modules are leaf nodes, such that the root node has no predecessor node and has one or more successor nodes comprising one or more of: an intermediate node and a leaf node. Further, each intermediate node has a predecessor node comprising one of: the root node and an intermediate node. Further, each intermediate node has a successor node comprising one of: an intermediate node and a leaf node. Further, each leaf node has no successor nodes and has a predecessor comprising one of: the root node or an intermediate node.

In one embodiment, the routing system routes a signal originating from a source node to a destination node. The routing system comprises a routing table for each node, wherein each routing table includes routing information for a router to direct an incoming signal to another node, such that a signal can only originate at a leaf node. Further, each originating leaf node selectively routes an outgoing signal to one or more of its predecessor nodes or to itself. Further, each receiving intermediate node selectively routes an incoming signal to one or more of: its predecessor nodes and its successor nodes. The root node selectively routes an incoming signal to one or more of its successor nodes. Each receiving leaf node consumes the incoming signal.

In one embodiment, routing information in the routing table for each node is reconfigurable such that a router directs an incoming signal to different nodes based on reconfigured routing information in a corresponding routing table, thereby achieving structural plasticity. The routing information in each routing table comprises a forwarding address for an incoming signal, wherein the forwarding address is reconfigurable.

In one embodiment, the network approximates a fully connected network such that each neuron can target and reach any axon in the neural network. The network approximates a fully connected network such that each outgoing connection on any core module can target and reach any incoming connection on any core module without requiring a fully connected network. Further, the network is reversible, allowing two-way information flow such that if an originating leaf node sends a signal to a consuming leaf node via the network, then the consuming leaf node can send a signal to the originating leaf node by a retracing path.

FIG. 1A shows a diagram of an example core circuit 10 having a crossbar 12 in accordance with an embodiment of the invention. In one example, the overall circuit may comprise an "ultra-dense crossbar array" that may have a pitch in the range of about 0.1 nm to 10 µm. The neuromorphic and synaptronic circuit 10 includes said crossbar 12 interconnecting a plurality of digital neurons 11 comprising neurons 14, 16, 18 and 20. These neurons 11 are also referred to herein as "electronic neurons". For illustration purposes, the example circuit 10 provides symmetric connections between the two pairs of neurons (e.g., N1 and N3). However, embodiments of the invention are not only useful with such symmetric connection of neurons, but also useful with asymmetric connection of neurons (neurons N1 and N3 need not be connected with the same connection). The crossbar in a core accommodates the appropriate ratio of synapses to neurons, and, hence, need not be square.

In the example circuit 10, the neurons 11 are connected to the crossbar 12 via dendrite paths/wires (dendrites) 13 such as dendrites 26 and 28. Neurons 11 are also connected to the crossbar 12 via axon paths/wires (axons) 15 such as axons 34 and 36. Neurons 14 and 16 are dendritic neurons and neurons 18 and 20 are axonal neurons connected with axons 13. Specifically, neurons 14 and 16 are shown with outputs 22 and 24 connected to dendrites (e.g., bitlines) 26 and 28, respectively.

Axonal neurons 18 and 20 are shown with outputs 30 and 32 connected to axons (e.g., wordlines or access lines) 34 and 36, respectively.

When any of the neurons 14, 16, 18 and 20 fire, they will send a pulse out to their axonal and to their dendritic connections. Each synapse provides contact between an axon of a neuron and a dendrite on another neuron and with respect to the synapse, the two neurons are respectively called pre-synaptic and post-synaptic.

Each connection between dendrites 26, 28 and axons 34, 36 are made through a digital synapse device 31 (synapse). The junctions where the synapse devices are located may be referred to herein as "cross-point junctions". In general, in accordance with an embodiment of the invention, neurons 14 and 16 will "fire" or "spike" (i.e., transmit a pulse) in response to the inputs they receive from axonal input connections (not shown) exceeding a threshold. Neurons 18 and 20 will "fire" (transmit a pulse) in response to the inputs they receive from external input connections (not shown), typically from other neurons, exceeding a threshold. In one embodiment, when neurons 14 and 16 fire they maintain a postsynaptic-STDP variable (post-STDP) variable that decays. For example, in one embodiment, the decay period may be 50 ms. The post-STDP variable is used to achieve STDP by encoding the time since the last firing of the associated neuron. Such STDP is used to control long-term potentiation or "potentiation", which in this context is defined as increasing synaptic conductance. When neurons 18, 20 fire they maintain a pre-STDP (presynaptic-STDP) variable that decays in a similar fashion as that of neurons 14 and 16.

Pre-STDP and post-STDP variables may decay according to exponential, linear, polynomial, or quadratic functions, for example. In another embodiment of the invention, the variables may increase instead of decrease over time. In any event, this variable may be used to achieve STDP by encoding the time since the last firing of the associated neuron. STDP is used to control long-term depression or "depression", which in this context is defined as decreasing synaptic conductance. Note that the roles of pre-STDP and post-STDP variables can be reversed with pre-STDP implementing potentiation and post-STDP implementing depression.

An external two-way communication environment may supply sensory inputs and consume motor outputs. Digital neurons 11 implemented using complementary metal-oxide semiconductor (CMOS) logic gates receive spike inputs and integrate them. In one embodiment, the neurons 11 include comparator circuits that generate spikes when the integrated input exceeds a threshold. In one embodiment, binary synapses are implemented using transposable 1-bit static random-access memory (SRAM) cells, wherein each neuron 11 can be an excitatory or inhibitory neuron (or both). Each learning rule on each neuron axon and dendrite are reconfigurable as described hereinbelow. This assumes a transposable access to the crossbar memory array.

Figure 1B:
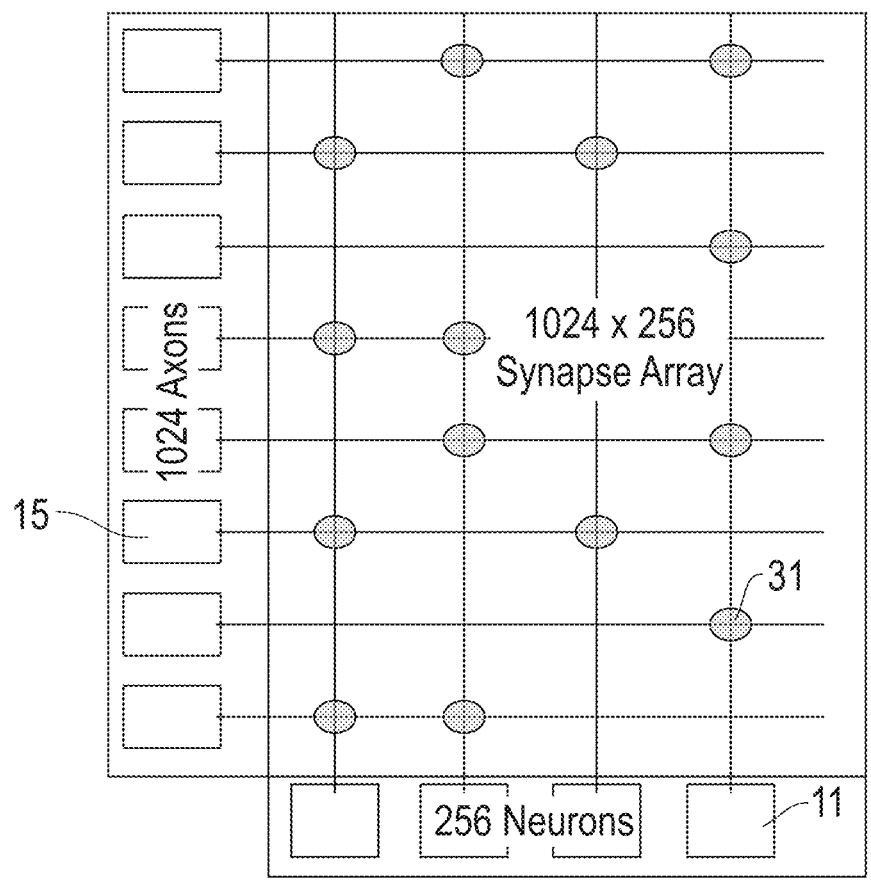
FIG. 1B shows a block diagram of a neural core circuit, in accordance with an embodiment of the invention.

Referring to FIG. 1B, in one example the core circuit 10 is a processor core including n electronic neurons, and a axons in the synapse crossbar array, wherein a=n×f (wherein "×" represents multiplication). In general, f is an integer greater than or equal to one, and n is an integer greater than or equal to one. Further, there are s synapses in the crossbar array, wherein s=n×a. In the example shown in FIG. 2 for a core module, n=256, f=4, a=1024 and s=1024×256.

In one embodiment of the invention, a neural network includes multiple core circuits, wherein the core circuits may be organized in a multi-level hierarchy. An example hierarchy for the core circuit comprises a tree structure including a plurality of linked nodes. In one embodiment, each node has zero or more child nodes and at most one parent node. In one implementation, the nodes comprise a root node, intermediate (inner) nodes and leaf nodes. An intermediate node is any node of the tree that has at least a child node and is not a leaf node. There is a core module at each node. The neural network includes a hierarchical routing system for addressing axons without requiring a fully connected network of core modules.

The routing system provides hierarchical routing of signals between the core modules. In one embodiment, the routing system comprises a routing module at each hierarchy level. In one embodiment, the routing module includes a routing table for each node, wherein each routing table includes forwarding addresses. At intermediate nodes, the routing module can route signals upward or downward. At leaf nodes, the routing module can route signals only upward. At the root node, the routing module can route signals only downward. In one embodiment, each node has a routing table. In one embodiment, the routing module at each level includes multiple routers with a router at each node.

Figure 2:
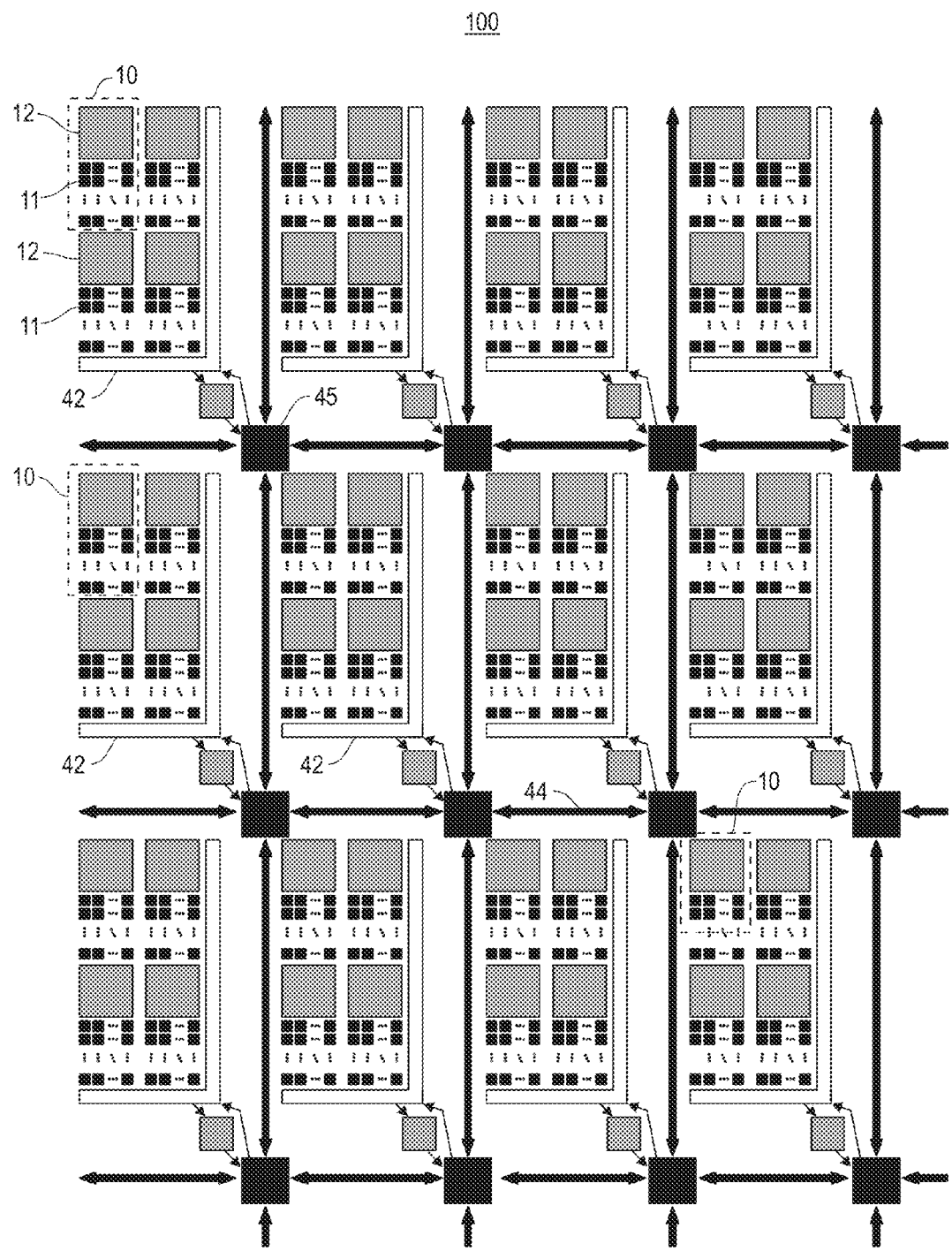
FIG. 2 shows a block diagram of a neural network including a routing system and multiple core circuits based on a hierarchical structure, in accordance with an embodiment of the invention.
Figure 3:
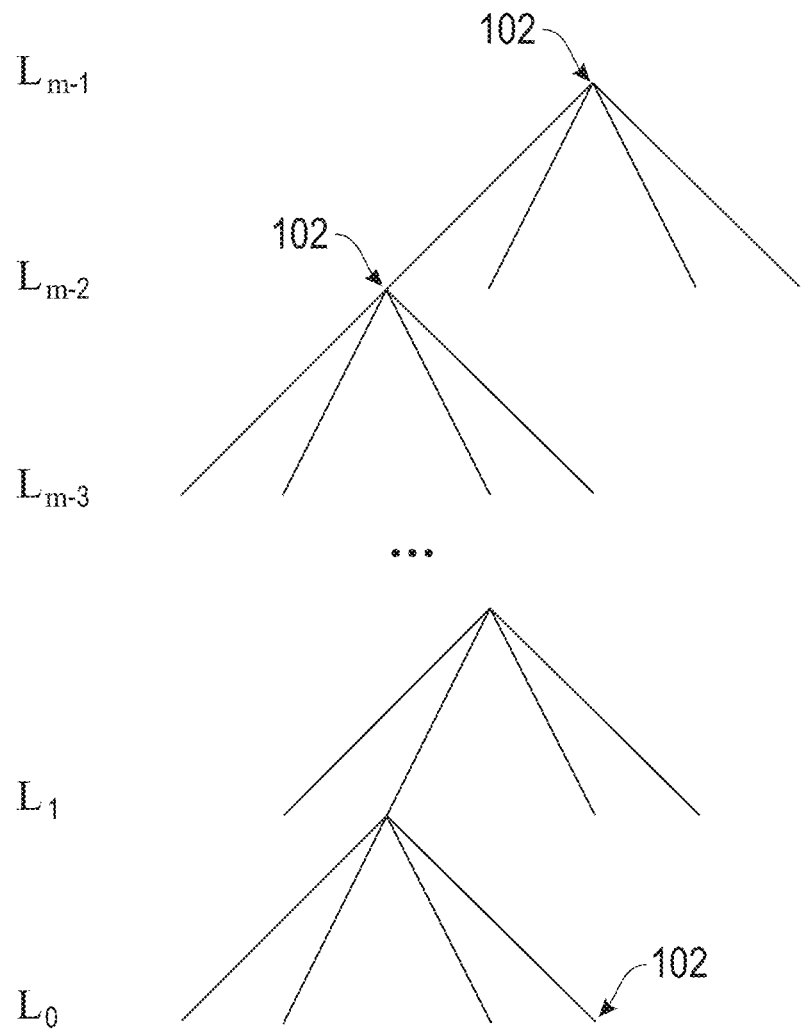
FIG. 3 shows an example hierarchy structure for information routing in a neural network, in accordance with an embodiment of the invention.

Referring to FIG. 2, an example neural network 100 includes multiple core modules 10. The neural network 100 further includes a routing system comprising routing tables 42 and routing fabric 44. Each routing table 42 for each core 10 converts spikes generated by the neurons into addresses. The routing table converts source neuron addresses into a list of destination axons where the spikes are delivered. A routing fabric 44 delivers spikes to the appropriate destination using routing modules 45. The core circuits may be organized in a multi-level hierarchy. FIG. 3 shows an example hierarchy 101 for organizing the core modules in m levels (i.e., $L_0, \ldots, L_{m-1}$). Leaf nodes are at hierarchy level $L_0$, intermediate nodes are at hierarchy levels $L_1, \ldots, L_{m-2}$, and a root node is at hierarchy level $L_{m-1}$. If each routing table has M forwarding addresses, then $\log_2 M$ bits are sufficient to address any axon. In one implementation, the neural network includes C core modules, wherein N is the total number of neurons in the neural network. The core modules may be organized in an m level hierarchy wherein $N=f^m \times n$.

In one example, C=4096 core modules, wherein n=256, m=6, f=4, a=1024, s=1024×256, q=½ as fraction of messages forwarded at an intermediate level, and total number of synapses in the neural network S=C×s. The multiple core modules can be represented as a Cartesian 64×64 x-y matrix or grid. Each element of the matrix is a core. For addressing purposes, 22 bits are needed to address any of the 4,194,304 axons. Specifically, 12 bits are to address each core module (6 bits for x-address and 6 bits for y-address). Within each core module, 10 bits are needed to address each axon therein. As such, every axon has an address. Table 1 below shows the above information in a tabular manner:

TABLE 1

Hierarchy Structure

| Level | Number of Forwarding Addresses/Table | Number of Tables | Total Number of Forwarding Addresses |
|---|---|---|---|
| 0 | 1,024 | $4^6$ | 4,194,304 |
| 1 | 3,072 | $4^5$ | 3,145,728 |
| 2 | 6,144 | $4^4$ | 1,572,864 |
| 3 | 12,288 | $4^3$ | 786,432 |
| 4 | 24,576 | $4^2$ | 393,216 |
| 5 | 49,152 | 4 | 196,608 |
| 6 | 98,304 | 1 | 98,304 |

Further, Table 2 below shows an example routing table including multiple forwarding address fields, according to an embodiment of the invention, wherein the format of a forwarding address in illustrated. Other formats for the forwarding address field (and information in each field) may also be utilized for achieving hierarchical routing according to embodiments of the invention.

TABLE 2

Routing Table

Forwarding address field 1:
[up/down routing subfield] [router select subfield] [routing address subfield]
In the current node, up/down routing subfield value can be 0 or 1, wherein "0" means up and "1" means down, then:
    for up/down routing subfield value 0 - then next bits in routing address subfield are an address into an up-router (i.e., the routing table of predecessor (father) node a level above the current node),
    for up/down routing subfield value 1 - then in router select sub field:
  one of values 00, 01, 10, 11 indicates one of the four down-routers (i.e., the routing table of one of the four successor (child) nodes a level below the current node), and remaining bits in the routing address sub field are address for that routing table.
Forwarding address field 2:
    [up/down routing subfield] [router select subfield] [routing address subfield]

Each incoming message to a node targets a certain predetermined address/location for a forwarding address in a routing table for that node, as indicated in the message. A forwarding address is stored in the target location, wherein each address leads to the location of the next forwarding address.

To prevent circular addressing, any routing request coming from an up-router can only go to a down-router. When a source neuron in a core module at a leaf node spikes, it sends f messages (e.g., spike signals) to the $L_0$ level routing module. Each message hits a unique forwarding address in the $L_0$ level routing module. In one example, one of the messages may rebound back to the core module, or it may get forwarded to another core module. If it is forwarded, then the message targets a $L_1$ level node, wherein the routing module for the $L_1$ level has another forwarding address in a forwarding table, and so on, until the message reaches a destination axon and neuron.

Messages can also flow backward if desired such that each destination neuron can reach the source neuron in the neural network. Within each routing module, a block is addressed by another block. For example, first addresses may be from down-router 00 below, then down-router 01 below, then down-router 10 below, then down-router 11 below, then a top level routing module. As such, a destination neuron can backtrack to a source neuron. In each routing table, forwarding addresses for two locations may be reconfigured (i.e., changed), thus allowing for structural plasticity in the routing system. Each neuron may target and reach any axon in the neural network. Thus, the routing system approximates a fully interconnected system while using sparse projections.

Figure 4D:
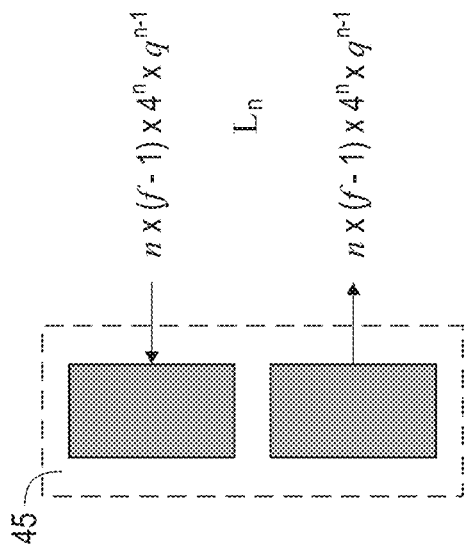
FIG. 4D shows a block diagram of another routing module and routing process based on a hierarchical structure in a neural network, in accordance with an embodiment of the invention.
Figure 4C:
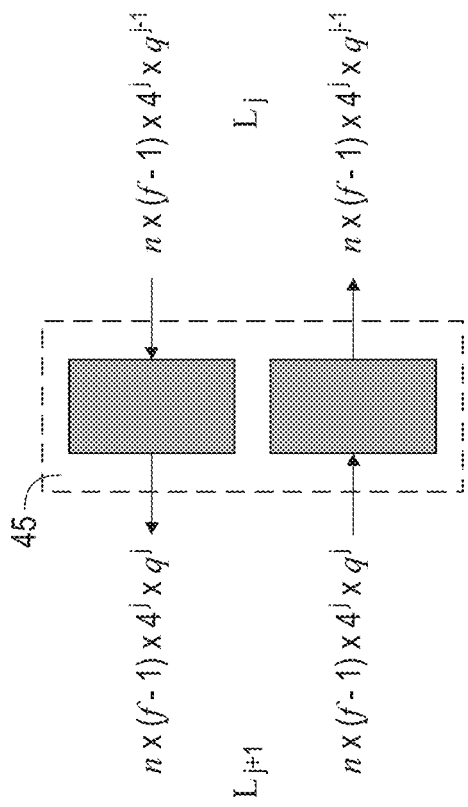
FIG. 4C shows a block diagram of another routing module and routing process based on a hierarchical structure in a neural network, in accordance with an embodiment of the invention.

FIG. 4A shows a routing module function for leaf level node. In FIG. 4A, example message routing between level $L_0$ and level $L_1$ is illustrated. At level $L_0$ is a leaf node comprising a core module with n×f axons, wherein n×f messages are outgoing from level $L_0$, and n×f messages are incoming into level $L_0$. For n×f outgoing messages, n×(f−1) messages are forwarded to level $L_1$, wherein n messages are consumed at level $L_0$ because there are n inputs to level $L_0$. The n messages are consumed at the leaf node, along with n×(f−1) messages that are incoming from the father node (at level $L_1$) for the leaf node at level $L_0$, wherein n×f messages are gained back at the leaf node. FIG. 4B shows a routing module function for an intermediate level node, message routing between level $L_2$ and level $L_1$. FIG. 4C shows a routing module function for an intermediate level node, message routing between level $L_j$ and level $L_{j+1}$. FIG. 4D shows a routing module function for a root level node $L_n$ and level $L_{n+1}$.

A routing table corresponding to each node at a hierarchy level allows selective routing of messages. When neurons in a core at a leaf node spike, a routing module utilizes the corresponding routing table to route the messages up to nodes at one or more higher levels. Certain messages received by a higher level node may be forwarded back (via a routing module) to the siblings of said leaf node (i.e., other leaf nodes). For example, when a neuron in a core at a leaf node spikes, f messages are forwarded to the $L_0$ level routing module. Each message hits a unique forwarding address in a routing table. In one example, a message may simply be forwarded back to that core, or it may get forwarded to another core (at the same hierarchy level or a different hierarchy level). In one example, if a message is forwarded, then it targets a $L_1$ level node, which has another forwarding address in its routing table, and so on.

Figure 5:
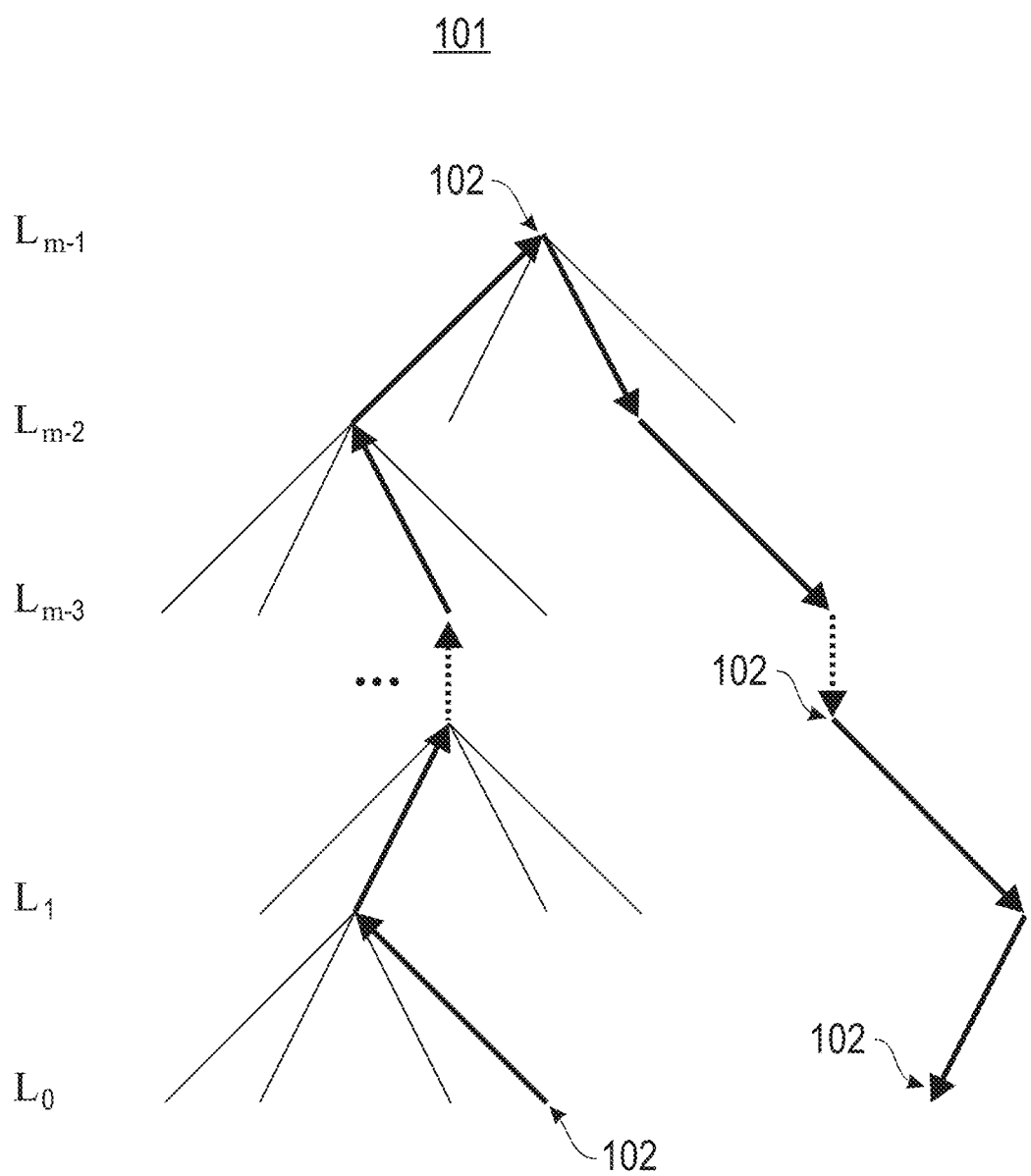
FIG. 5 shows a routing process based on a hierarchical structure in a neural network, in accordance with an embodiment of the invention.

Referring to the example forwarding sequence in FIG. 5, when a neuron in a node at level $L_0$ spikes (i.e., leaf node), a routing mode sends a message to the father node at a next higher level, wherein the father node in turn determines where to forward the message to. In this example, the message is routed to the root node and then routed back to another leaf node by the routing modules at different levels, as indicated by the bold lines.

Figure 6:
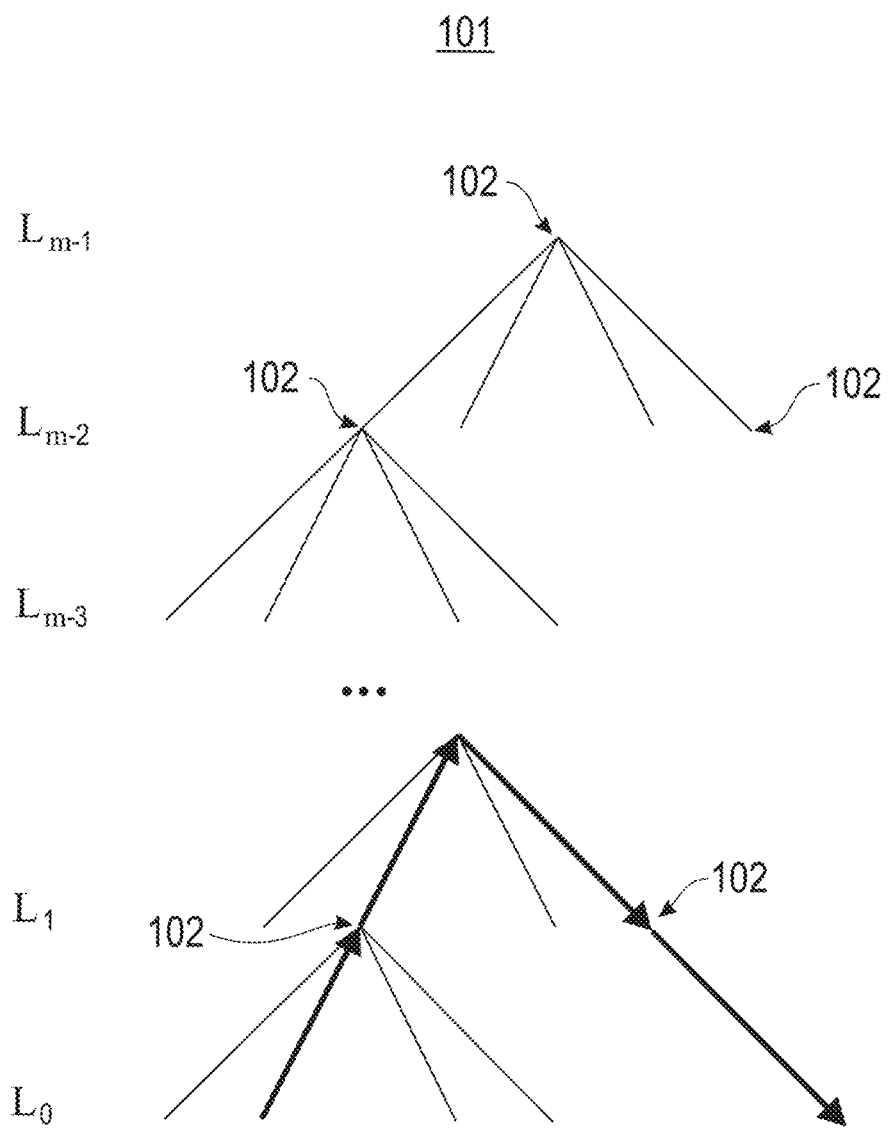
FIG. 6 shows a routing process based on a hierarchical structure in a neural network, in accordance with an embodiment of the invention.

Referring to the example message forwarding (i.e., spike routing) sequence in FIG. 6, when a neuron in a leaf node spikes, a message is routed upward and then downward in the hierarchy to another leaf node (without reaching the root node), as indicated by the bold lines. An intermediate node (i.e., a node at an intermediate level) forwards the message down in the hierarchy.

In a flat routing approach, each core communicates with every other core. In a hierarchical routing approach according to the invention, the nodes communicate base on the hierarchy. When a routing module at an intermediate hierarchy level receives a message, the routing module can either route the message up to a higher level or down to a lower level.

As such, the cores with addressable axons are organized in a hierarchical tree. At each level of the tree, a routing module utilizes a routing table to provide a forwarding address for an incoming message to a node at that level. The routing tables are reprogrammable for a reconfigurable routing system. As such, any neuron can reach any other neuron via a change in the hierarchical addresses in the routing tables.

Figure 7A:
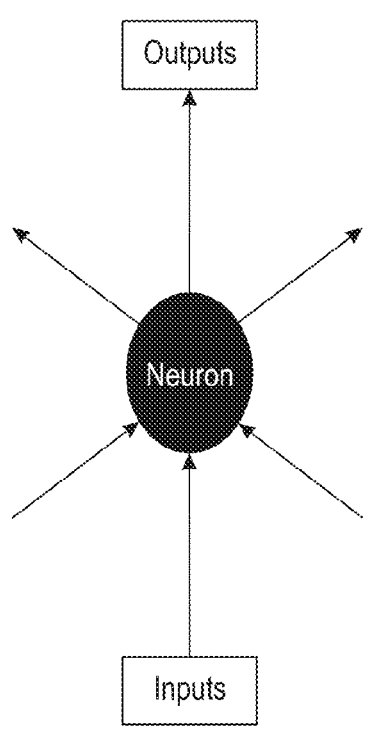
FIG. 7A shows an example neuron model in a neural network having a hierarchical routing structure, in accordance with an embodiment of the invention.
Figure 7B:
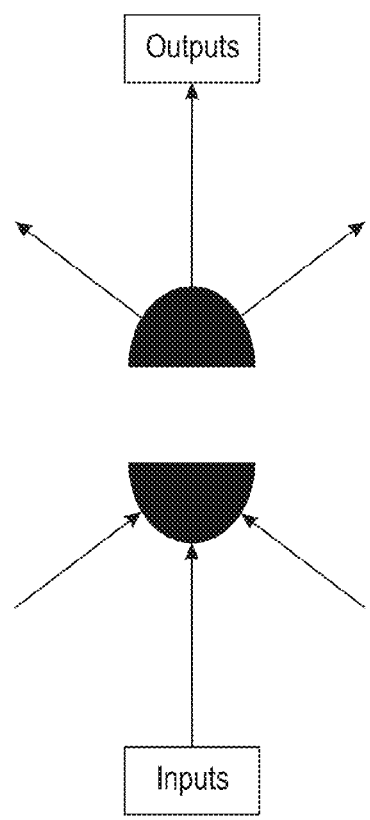
FIG. 7B shows an example neuron model in a neural network having a hierarchical routing structure, in accordance with an embodiment of the invention.
Figure 8A:
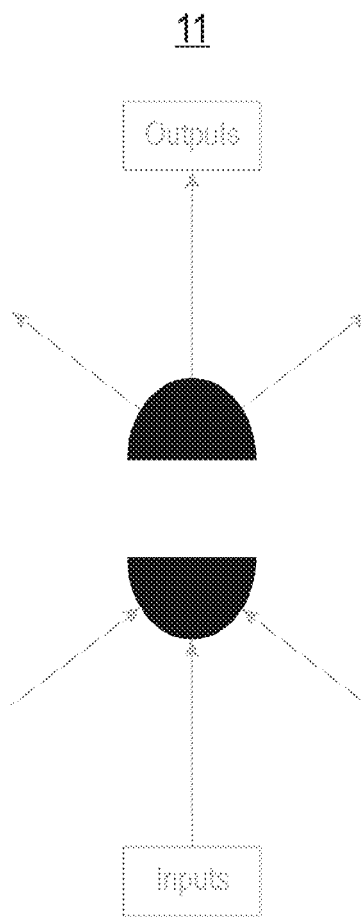
FIG. 8A shows an example neuron model with logically separate inputs and outputs in a neural network having a hierarchical routing structure, in accordance with an embodiment of the invention.
Figure 8B:
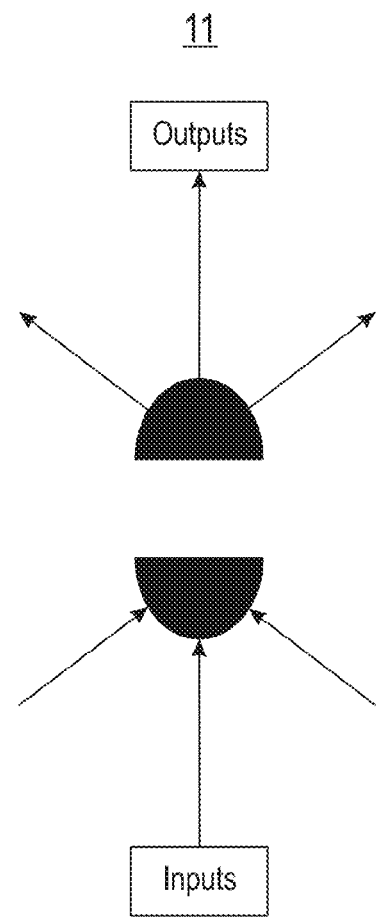
FIG. 8B shows an example neuron model with logically separate inputs and outputs in a neural network having a hierarchical routing structure, in accordance with an embodiment of the invention.
Figure 9A:
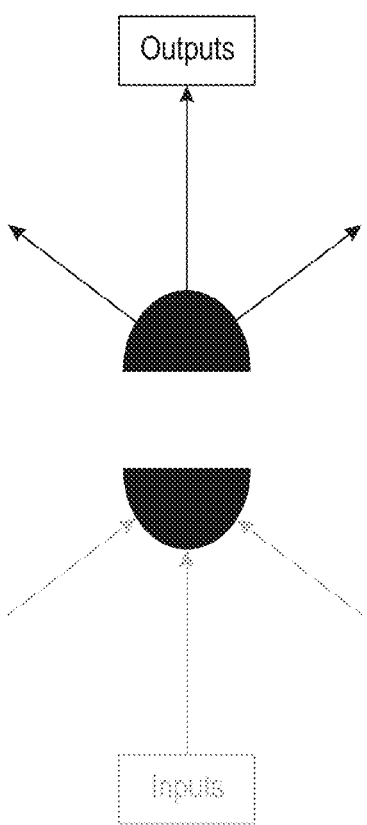
FIG. 9A shows an example neuron model with logically separate inputs and outputs in a neural network having a hierarchical routing structure, wherein information flow is rerouted by reconfiguration, in accordance with an embodiment of the invention.
Figure 9B:
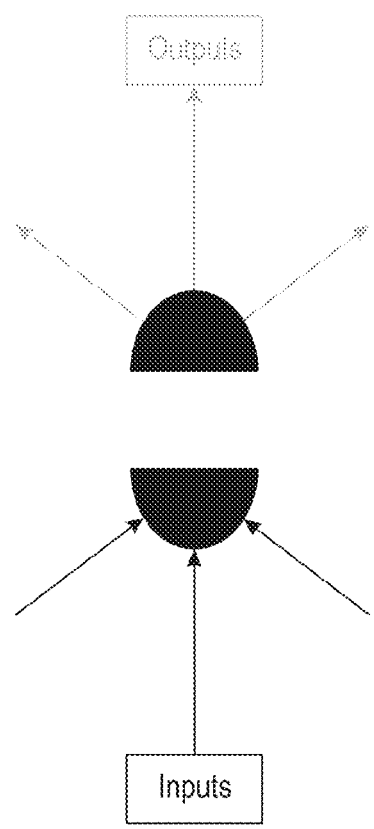
FIG. 9B shows an example neuron model with logically separate inputs and outputs in a neural network having a hierarchical routing structure, wherein information flow is rerouted by reconfiguration, in accordance with an embodiment of the invention.

FIG. 7A shows an example neuron model with three inputs and three outputs. FIG. 7B shows the neuron logically divided into an input part and an output part. FIGS. 8A and 8B show two separated neurons logically divided up into input parts and output parts. FIGS. 9A and 9B show the neurons in FIGS. 8A and 8B, respectively, wherein reprogrammed routing tables allow inputs of the neuron in FIG. 9A routed to the outputs of the neuron in FIG. 9B, and inputs of the neuron in FIG. 9B routed to outputs of the neuron in FIG. 9A, according to an embodiment of the invention. As such, though the two neurons are not physically fully connected, the reprogrammable routing tables allow routing of messages between different inputs/outputs of the neurons at different times as needed to approximate a fully connected system while using very sparse projection and connectivity between the neurons.

Figure 10:
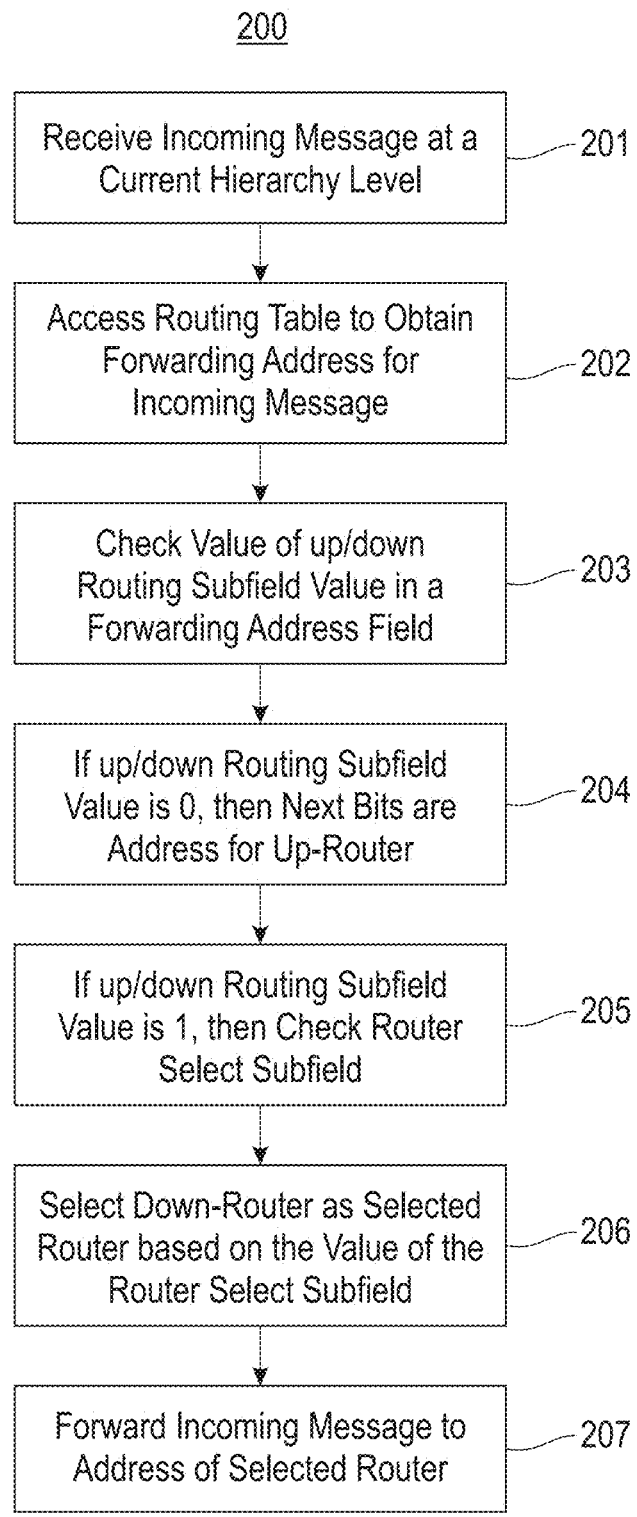
FIG. 10 shows a flowchart of an example process 200 for hierarchical routing for two-way information flow and structural plasticity in a neural network, in accordance with an embodiment of the invention.

FIG. 10 shows a flowchart of an example process 200 for hierarchical routing and two-way information flow in a neural network with a routing hierarchy such as shown in FIG. 3, according to an embodiment of the invention. In process block 201 a routing module in a hierarchy level receives an incoming message for a current node. In process block 202 a routing table (such as Table 2 above) is accessed to determine forwarding address for the incoming message. In process block 203 an up/down routing subfield value is checked wherein a value "0" means forwarding up to a higher layer in the hierarchy and a value "1" means forwarding down to a lower hierarchy level.

In process block 204, for up/down routing subfield value 0, the next bits in a routing address subfield are an address into an up-router at a hierarchy level immediately above the current hierarchy level, wherein the up-router is the selected router. In process block 205, for up/down routing subfield value 1, the router select subfield is checked. In process block 206, based on the router select subfield value (i.e., 00, 01, 10 or 11) one of the down-routers (i.e., the routing table of one of the four successor (child) nodes a level below the current node) in a hierarchy level immediately below the current hierarchy level is selected, and remaining bits in the routing address sub field are address for the selected down-router. In process block 207, the incoming message is forwarded to address of the selected router.

Figure 11:
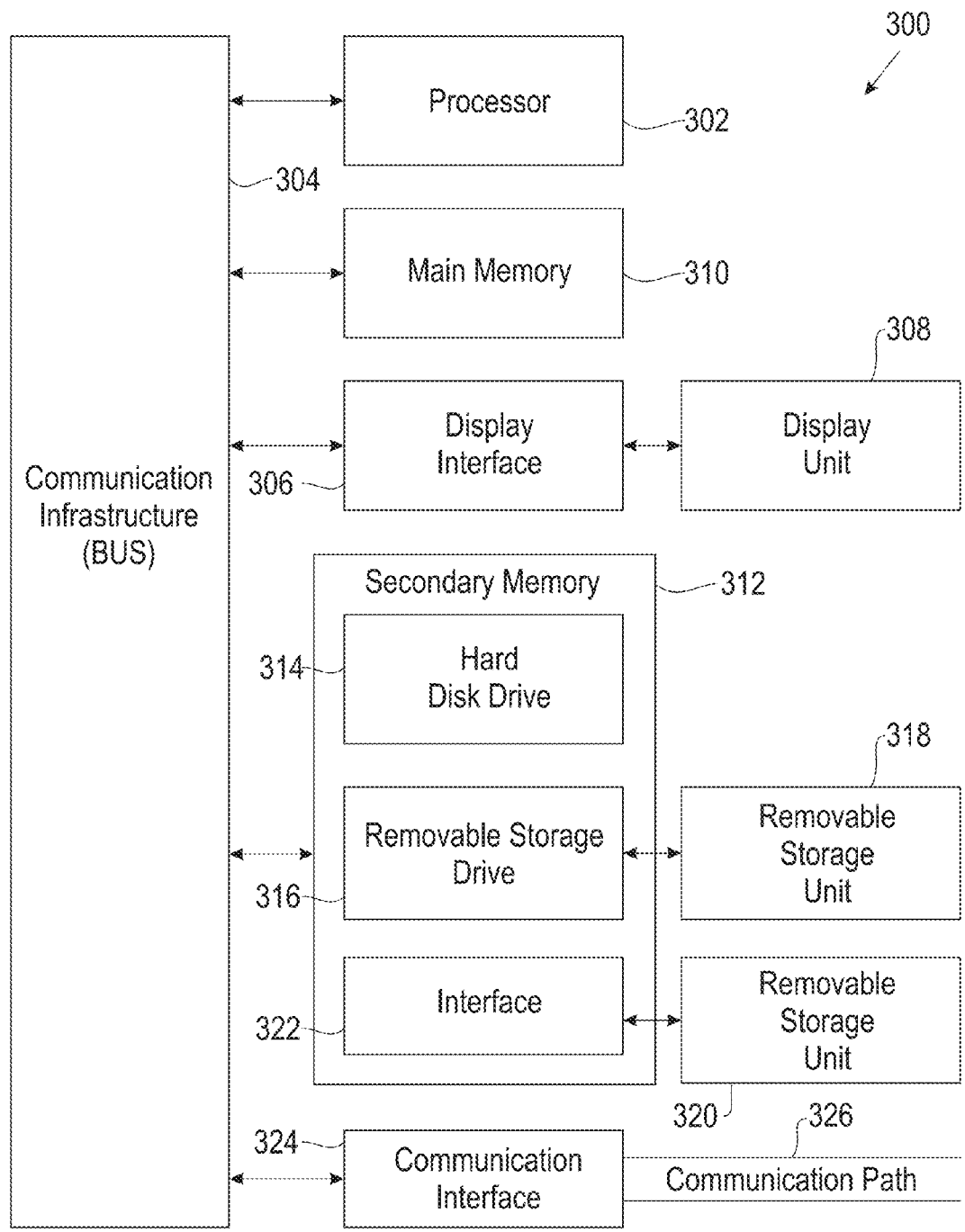
FIG. 11 shows a high level block diagram of an information processing system useful for implementing one embodiment of the present invention.

FIG. 11 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A network of core modules, comprising:
    multiple core modules, wherein each core module comprises a core circuit that includes:
        a plurality of electronic neurons;
        a plurality of incoming connections for receiving incoming signals targeting the plurality of neurons, wherein each incoming connection has a predetermined address; and
        a plurality of outgoing connections for transmitting outgoing signals generated by the plurality of neurons, wherein each outgoing connection targets an incoming connection in a core module among the multiple core modules; and
    a routing system comprising multiple routers that selectively route signals among the multiple core modules based on a reconfigurable hierarchical organization of the core modules.

2. The network in claim 1, wherein each core circuit of each core module further comprises:
    a plurality of axons, wherein the plurality of axons include the plurality of incoming connections;
    a plurality of dendrites; and
    an electronic synapse array comprising multiple digital synapses interconnecting the plurality of axons with the plurality of dendrites, wherein a synapse interconnects an axon of a presynaptic neuron with a dendrite of a postsynaptic neuron;
    wherein each postsynaptic neuron connects to an outgoing connection; and
    wherein each neuron integrates input spikes and generates a spike event in response to the integrated input spikes exceeding a firing threshold.

3. The network of claim 1, wherein:
    the hierarchical organization of the core modules comprises a reconfigurable tree structure including a plurality of linked nodes with a core module at each node such that a core module is a root node, one or more core modules are intermediate nodes, and one or more core modules are leaf nodes, wherein:
        the root node has no predecessor node and has one or more successor nodes comprising one or more of: an intermediate node and a leaf node;
        at least one intermediate node has a predecessor node comprising the root node;
        at least one intermediate node has a successor node comprising a leaf node; and
        each leaf node has no successor nodes.

4. The network of claim 3, wherein:
    for each node, the routing system comprises:
        a corresponding routing table at said node, wherein said corresponding routing table includes routing information for routing a signal originating from a source node to a destination node in the tree structure; and
        a corresponding router at said node for routing a signal originating from a source node to a destination node in the tree structure based on routing information in said corresponding routing table.

5. The network of claim 4, wherein:
    for each node, a corresponding router for said node directs an incoming signal to another node based on routing information in a corresponding routing table for said node, such that:
        a signal can only originate at a leaf node;
        each originating leaf node selectively routes an outgoing signal to one or more of its predecessor nodes or to itself;
        each receiving intermediate node selectively routes an incoming signal to one or more of: its predecessor nodes and its successor nodes;
        the root node selectively routes an incoming signal to one or more of its successor nodes; and
        each receiving leaf node consumes the incoming signal.

6. The network of claim 4, wherein:
    for each node, routing information in a corresponding routing table for said node is reconfigurable such that a corresponding router for said node directs an incoming signal to one or more different nodes based on reconfigured routing information in said corresponding routing table, thereby achieving structural plasticity.

7. The network of claim 6, wherein:
    for each node, routing information in a corresponding routing table for said node comprises a forwarding address for an incoming signal, wherein the forwarding address is reconfigurable.

8. The network of claim 7, wherein:
    the network approximates a fully connected network such that each neuron can target and reach any axon in the network.

9. The network of claim 7, wherein:
    the network is reversible, allowing two-way information flow such that if an originating leaf node sends a signal to a consuming leaf node via the network, then the consuming leaf node can send a signal to the originating leaf node by a retracing path.

10. A method for signal delivery in a network including multiple core modules, wherein each core module comprises a plurality of electronic neurons, a plurality of incoming connections with predetermined addresses, and a plurality of outgoing connections, the method comprising:
    in each core module:
        receiving incoming signals targeting the plurality of neurons of the core module via the plurality of incoming connections of the core module; and
        transmitting outgoing signals generated by the plurality of neurons of the core module via the plurality of outgoing connections of the core module, wherein each outgoing connection targeting an incoming connection in a core module among the multiple core modules; and
    selectively routing, via multiple routers, signals among the multiple core modules based on a reconfigurable hierarchical organization of the core modules.

11. The method of claim 10, wherein:
    each core module further comprises:
        a plurality of axons, wherein the plurality of axons include the plurality of incoming connections;
        a plurality of dendrites; and
        an electronic synapse array comprising multiple digital synapses interconnecting the plurality of axons with the the plurality of dendrites, wherein a synapse interconnects an axon of a presynaptic neuron with a dendrite of a postsynaptic neuron; each postsynaptic neuron connects to an outgoing connection; and the method further comprises:
  each neuron integrating input spikes and generating a spike event in response to the integrated input spikes exceeding a firing threshold.

12. The method of claim 10, wherein:
the hierarchical organization of the core modules comprises a reconfigurable tree structure including a plurality of linked nodes with a core module at each node;
the method further comprises designating the core modules in the tree structure as root, intermediate and leaf nodes, wherein a core module is a root node, one or more core modules are intermediate nodes, and one or more core modules are leaf nodes, such that:
  the root node has no predecessor node and has one or more successor nodes comprising one or more of: an intermediate node and a leaf node;
  at least one intermediate node has a predecessor node comprising the root node;
  at least one intermediate node has a successor node comprising a leaf node; and
  each leaf node has no successor nodes.

13. The method of claim 12, wherein selective routing further comprises:
for each node:
  maintaining a corresponding routing table for said node, wherein said corresponding routing table includes routing information for routing a signal originating from a source node to a destination node in the tree structure; and
  providing a corresponding router at said node for routing a signal originating from a source node to a destination node in the tree structure based on routing information in said corresponding routing table.

14. The method of claim 13, wherein:
for each node, a corresponding router for said node directs an incoming signal to another node based on routing information in a corresponding routing table for said node, such that:
  a signal can only originate at a leaf node;
  each originating leaf node selectively routing an outgoing signal to one or more of its predecessor nodes or to itself;
  each receiving intermediate node selectively routing an incoming signal to one or more of its predecessor nodes and its successor nodes; and
  the root node selectively routing an incoming signal to one or more of its successor nodes; and
  each receiving leaf node consuming the incoming signal.

15. The method of claim 13, wherein:
for each node, routing information in a corresponding routing table for said node is reconfigurable such that a corresponding router for said node directs an incoming signal to one or more different nodes based on reconfigured routing information in said corresponding routing table, thereby achieving structural plasticity.

16. The method of claim 15, wherein:
for each node, routing information in a corresponding routing table for said node comprises a forwarding address for an incoming signal, wherein the forwarding address is reconfigurable.

17. The method of claim 16, wherein:
the network approximates a fully connected network such that each neuron can target and reach any axon in the neural network.

18. The method of claim 16, wherein:
the network is reversible, allowing two-way information flow such that if an originating leaf node sends a signal to a consuming leaf node via the network, then the consuming leaf node can send a signal to the originating leaf node by a retracing path.

19. A non-transitory computer-useable storage medium for signal delivery in a network including multiple core modules, wherein each core module comprises a plurality of electronic neurons, a plurality of incoming connections with predetermined addresses, and a plurality of outgoing connections, said medium having a computer-readable program, wherein the program upon being processed on a computer causes the computer to implement the steps of:
in each core module:
  receiving incoming signals targeting the plurality of neurons of the core module via the plurality of incoming connections of the core module; and
  transmitting outgoing signals generated by the plurality of neurons of the core module via the plurality of outgoing connections of the core module, wherein each outgoing connection targeting an incoming connection in a core module among the multiple core modules; and
selectively routing, via multiple routers, signals among the multiple core modules based on a reconfigurable hierarchical organization of the core modules.

20. The non-transitory computer-useable storage medium of claim 19, wherein:
the hierarchical organization of the core modules comprises a reconfigurable tree structure including a plurality of linked nodes with a core module at each node; and
the program upon being processed on a computer causes the computer to further implement the steps of:
  designating the core modules in the tree structure as root, intermediate and leaf nodes, wherein a core module is a root node, one or more core modules are intermediate nodes, and one or more core modules are leaf nodes, such that:
    the root node has no predecessor node and has one or more successor nodes comprising one or more of: an intermediate node and a leaf node;
    at least one intermediate node has a predecessor node comprising the root node;
    at least one intermediate node has a successor node comprising a leaf node; and
    each leaf node has no successor nodes; and
  maintaining a routing table for each node for selectively routing a signal originating from a source node to a destination node in the tree structure.

* * * * *